(12) United States Patent
Hu

(10) Patent No.: US 9,910,842 B2
(45) Date of Patent: Mar. 6, 2018

(54) INTERACTIVELY PREDICTING FIELDS IN A FORM

(71) Applicant: Captricity, Inc., Oakland, CA (US)

(72) Inventor: Hui Peng Hu, Berkeley, CA (US)

(73) Assignee: Captricity, Inc., Oakland, CA (US)

( * ) Notice: Subject to any disclaimer, the term of this patent is extended or adjusted under 35 U.S.C. 154(b) by 261 days.

(21) Appl. No.: 14/824,493

(22) Filed: Aug. 12, 2015

(65) Prior Publication Data
US 2017/0046324 A1    Feb. 16, 2017

(51) Int. Cl.
*G06F 17/00* (2006.01)
*G06F 17/24* (2006.01)
*G06F 17/30* (2006.01)
*G06F 3/0481* (2013.01)

(52) U.S. Cl.
CPC ........ *G06F 17/243* (2013.01); *G06F 3/04812* (2013.01); *G06F 17/30253* (2013.01)

(58) Field of Classification Search
None
See application file for complete search history.

(56) References Cited

U.S. PATENT DOCUMENTS

| | | | | |
|---|---|---|---|---|
| 8,165,899 B2* | 4/2012 | Yeh | ........................ | G06Q 10/00 600/300 |
| 2004/0015778 A1* | 1/2004 | Britton | .................. | G06F 17/211 715/205 |
| 2004/0146199 A1* | 7/2004 | Berkner | .................. | G06T 11/60 382/176 |
| 2005/0196074 A1* | 9/2005 | Deere | ................... | G06K 9/2054 382/305 |
| 2006/0143154 A1* | 6/2006 | Jager | .................. | G06F 17/30011 |
| 2007/0168382 A1* | 7/2007 | Tillberg | ............ | G06F 17/30253 |
| 2012/0062961 A1* | 3/2012 | Yamaai | .................. | G06F 17/243 358/448 |
| 2012/0063684 A1* | 3/2012 | Denoue | .................. | G06F 17/243 382/175 |
| 2013/0111322 A1* | 5/2013 | Marum | .................. | G06F 17/243 715/223 |
| 2014/0006917 A1* | 1/2014 | Saund | ................ | G06K 9/00449 715/222 |
| 2015/0205777 A1* | 7/2015 | Campanelli | ........... | G06F 17/243 715/226 |
| 2015/0317296 A1* | 11/2015 | Vohra | ................ | G06F 17/30011 715/221 |
| 2016/0012030 A1* | 1/2016 | Tran | ....................... | G06F 17/243 715/222 |
| 2016/0217119 A1* | 7/2016 | Dakin | ................... | G06F 17/276 |

\* cited by examiner

*Primary Examiner* — Howard Cortes
(74) *Attorney, Agent, or Firm* — Perkins Coie LLP

(57) ABSTRACT

Methods, apparatuses, and embodiments related to interactively predicting fields in a form. A computer system received an image of a form. A user moves a cursor to a first field of the form, and the computer system automatically displays a predicted location of the field, including a bounding box that represents a boundary of the field. The computer system further predicts the field name/label based on text in the document. The user clicks on the field to indicate that he wants to digitize the field. When needed, the user interactively modifies the size of the bounding box that represents the extent of the field, changes the name/label of the field. Once finalized, the user can cause the field information (e.g., the bounding box coordinate, the bounding box location, the name/label of the field, etc.) to be written to a database.

11 Claims, 10 Drawing Sheets

Registration Form

Child's Name _____ Child's Social Security # _____

Address: _____ Apt.# ____ City _____ State: ___

Zip Code: _____ Home Telephone: _____

Date of Birth: _____ Place of Birth: _____
Birth Certificate Number: _____

Immunization Dates: Polio _____ DPT _____ Varicella ____
                    HIB _____ HepB _____ MMR ____
If Baptized: Date: _____ Church _____
Church Address: _____

Name of School or Pre-School Child Now Attends: _____
Address: _____ Telephone: _____

FATHER: Name _____ Date/Place of Birth _____
Soc.Sec.# _____ Occupation _____ Work Tel. _____
Company Name/Address _____

MOTHER: Name _____ Date/Place of Birth _____
Soc.Sec.# _____ Occupation _____ Work Tel. _____
Company Name/Address _____

Parents are: ___ married ___ single ___ separated ___ divorced

EMERGENCY NOTIFICATION: If parents cannot be reached, notify:
Name _____ Tel.# _____ Relation to child: _____

OTHER CHILDREN IN FAMILY. Please list name and date of birth of brothers/sisters, if any: _____

I HEREBY GIVE MY RELEASE AND CONSENT, IN CASE OF AN EMERGENCY, FOR MY CHILD TO BE TREATED BY A DOCTOR OR HOSPITAL EMERGENCY ROOM, IF I CANNOT BE REACHED AT HOME OR AT WORK.
Date: _____ Parent Signature _____

Child's Current Grade: _____ Principal Approval: _____ Date: _____

*FIG. 3*

DMV

APPLICATION FOR ASSIGNED VEHICLE IDENTIFICATION NUMBER PLATE

410 — 405 — 415 — 420

| FOR DMV USE ONLY | |
|---|---|
| DRIVER LICENSE OR ID CARD NO. OF APPLICANT | TECH INITIALS |

| CA LICENSE PLT NO. | MAKE | YR. MODEL | IDENTIFICATION NO. IF ANY (FROM DOCUMENTS) | ENGINE NO. IF ANY (FROM DOCUMENTS) |
|---|---|---|---|---|

REASONS FOR REQUEST FOR ASSIGNED NUMBER

REGISTERED OWNER (PRINT TRUE FULL NAME – Last, First, Middle)

| ADDRESS | CITY | STATE | ZIP CODE |
|---|---|---|---|

I certify under penalty of perjury under the laws of the State of California the information entered by me is true and correct and that I am the lawful owner of or have a lien against the above described vehicle.

| APPLICANT'S SIGNATURE | | PRINTED NAME | | | DATE |
|---|---|---|---|---|---|
| X | | | | | |

FOR DEPARTMENT OF MOTOR VEHICLES USE ONLY

| LICENSE NO. | STATE | MAKE | YR. MODEL | BODY TYPE | MO. POWER | AXLES | EST. WEIGHT (TRLS) | VIN PLATE AFFIXED TO FRAME |
|---|---|---|---|---|---|---|---|---|

| IDENTIFICATION NO. OR EXPLANATION, IF NONE | ENGINE NO. OR EXPLANATION, IF NONE | VIN PLATE AFFIXED TO FRAME |
|---|---|---|

I certify that I physically inspected the above described vehicle and did affix the numbered VIN plate(s) to that vehicle.

| EMPLOYEE SIGNATURE | PRINTED NAME | TITLE | OFC. ID. | DATE |
|---|---|---|---|---|
| X | | | | |

| DMV REFERRAL TO CHP (IF REFERRED TO CHP CALL FOR APPOINTMENT) | REFERRING OFFICE | RECEIPT NO. | OFC. ID. | WORK DATE | TECH ID. SEQ. NO. |
|---|---|---|---|---|---|
| | REASON FOR REFERRAL | | | | |
| | EMPLOYEE SIGNATURE<br>X | PRINTED NAME | TITLE | OFC. ID. | DATE |

(Form rotated 90°: "Application for Assigned Vehicle Identification Number Plate" DMV form with fields including CA License Plt No., Make, Yr. Model, Identification No., Reasons for Request for Assigned Number, Registered Owner, Address, City, State, Zip Code, Applicant's Signature, Date, and "For Department of Motor Vehicles Use Only" section with License No., State, Make, Yr. Model, Body Type, Mo. Power, Axles, Est. Weight (Trls), VIN Plate Affixed to Frame, Identification No. or Explanation, Employee Signature, Printed Name, Receipt No., Ofc. ID., Title, Work Date, Tech ID. Seq. No., DMV Referral to CHP section. Callouts 425, 430, 435, 440.)

FIG. 5

| Diagnosis | New Cases | Follow-up | Referrals | Deaths PHU | Deaths Community | Total |
|---|---|---|---|---|---|---|
| Malaria | | | | | | |
| Anaemia | | | | | | |
| All others | | | | | | |
| Diarrhoea With Blood (Dysentery) | | | | | | |
| Yellow Fever | | | | | | |
| Wounds/Trauma | | | | | | |
| Tetanus | | | | | | |
| Lassa Fever | | | | | | |
| Measles | | | | | | |
| Etc. etc. | | | | | | |

*FIG. 7*

INTERACTIVELY PREDICTING FIELDS IN A FORM

BACKGROUND

Filling out paper forms is a part of life. A trip to a doctor's office, to the department of motor vehicles (DMV), to an office of a potential new employer, etc., often involves filling out a paper form. Such forms have fields for people to provide information, such as a field for a person's name, another for his address, yet another for his phone number, etc. An employee of the doctor, the DMV, etc. often electronically captures the information entered on the form by manually entering the information into a computer. Once electronically captured, the information can be added to a database, a spreadsheet, an electronic document, etc., where the information can be stored for future reference.

BRIEF DESCRIPTION OF THE DRAWINGS

One or more embodiments are illustrated by way of example in the figures of the accompanying drawings, in which like references indicate similar elements.

FIG. 3 is an illustration of a blank school registration form, consistent with various embodiments.

FIGS. 4A and 4B are illustrations of a Department of Motor Vehicles (DMV) form, consistent with various embodiments.

FIG. 5 is an illustration of a blank DMV form, consistent with various embodiments.

FIG. 7 in an illustration of a disease data table, consistent with various embodiments.

DETAILED DESCRIPTION

Figure 1A:
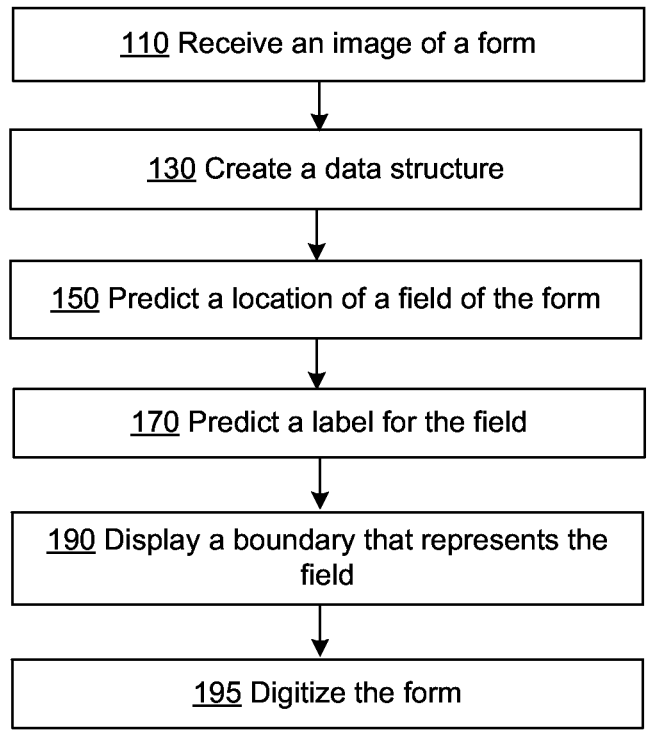
FIGS. 1A-D are flow diagrams illustrating an example process of determining a location of a field on a form based on an image of the form, consistent with various embodiments.
Figure 1B:
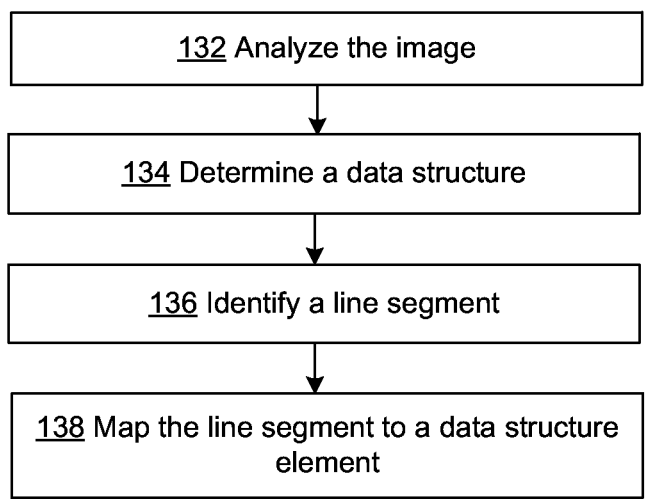
Figure 1C:
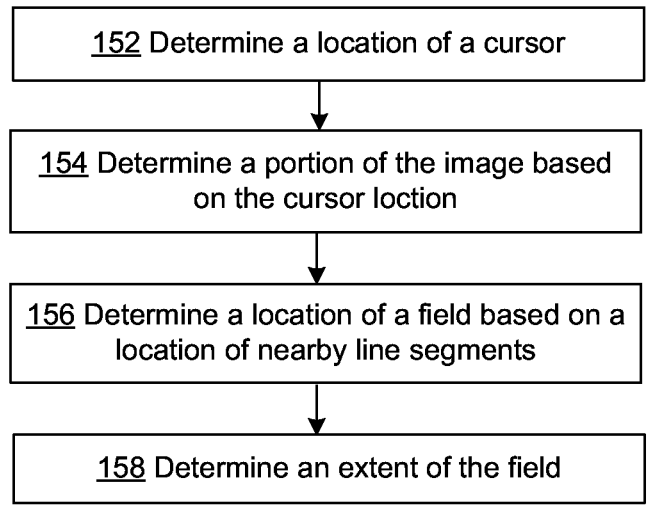
Figure 1D:
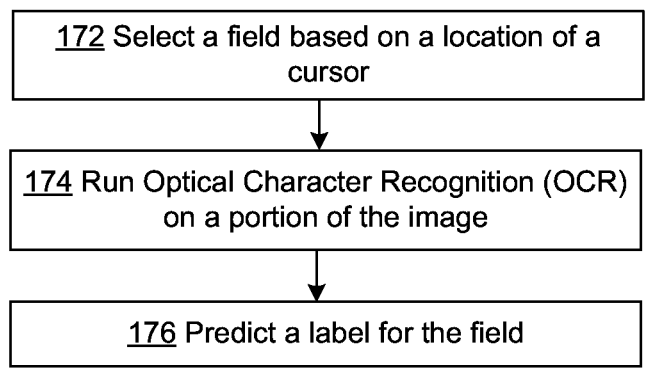

Introduced here is technology related to automatically identifying fields and/or tables in an image of a paper form. The image can be obtained, for example, by scanning or photographing the form. A field is a space on a form for an item of information to be entered, such as by being written or typed in the field. In some embodiments, a field is additionally a space on a form that contains label information related to a table. A field can be a standalone field, a location in a table for placing data, a location in a table that contains text that identifies a row or column of a table, etc. Examples of fields include a name field, an address field, a driver's license number field, a social security number field, a comment field, a symptom description field, a date field, a signature field, a row one column one field in a table, a row two column five field in a table, a field of a table that contains text where the text is used as part of labels of fields in a row or column of the table, etc.

After a person fills out a form, which entails entering data/information in the various fields, the data/information often needs be to electronically captured and stored, such as in a database, spreadsheet, electronic document, etc. To improve the productivity of electronically capturing form data/information, it is desirable to automatically extract and capture information from a filled out form (i.e., a "completed" form).

In a first example process for digitizing a form, a user obtains an image of a form by scanning the form. The form is preferably blank, but in some embodiments can also be filled out. The user views the image of the form using a computer. The user uses a mouse to enter a first box that defines the bounds of a first field, uses the mouse to enter a second box that defines the bounds of a second field, etc. The "bounds" or "boundary" of a field is one way to define the "location" of the field. The user next provides an identify/label for each box. For example, the user selects the first box using the mouse, and enters "name" using a keyboard, thereby identifying/labeling the first box as the "name" field. The user next selects the second box and enters "phone number", thereby defining the second box as the "phone number" field.

The form also includes a ten by ten data table. The user one by one selects boxes that represent the boundary/location of each of the one hundred fields of the data table, and types in the identity/label of each of the fields. For example, the user selects the row one column one field box and types "R1C1" to identify the field as the row 1 column 1 field. Once all of the fields of the form have been located and identified, the user, using the computer, creates a digitized representation of the form, which includes the locations and identities of all of the fields.

Once the form has been digitized, the information entered in the various fields can be automatically extracted from an image of a completed version of the form. In an example, a computer system obtains an image of a completed form by scanning the completed form. The computer matches and aligns the image with a digitized representation of the form. Once matched and aligned, the locations and identities of the various fields from the digitized representation of the form can be used to locate the corresponding fields on the completed form.

For example, (X,Y) coordinates of the "name" field box, or the "R1C1" field box, can be used to locate an area on the completed form where a person's name or the row one column one table data is expected to appear. Optical character recognition (OCR) can be run on an area of the form that is based on the field boundary, and the person's name or the row one column one table data can be automatically extracted based on the OCR results. For example, the boundary of the field can be oversized by a predetermined amount, and OCR can be run on the area of the form that overlaps with the oversized boundary box to determine text that appears within the oversized boundary box.

Further, because the digitized representation of the form includes an identity of each field, text entered in each field can be automatically stored in the proper location in a database entry. For example, a database entry can be created for a particular completed form. A person entered "John Doe" in the "name" field, and "2.0" in the "R1C1" field of this particular completed form. An OCR of the "name" and "R1C1" fields of this particular completed form determined that the text in these field is, respectively, "John Doe" and "2.0". The computer system writes "John Doe" to the "name" field, and "2.0" to the "R1C1" field, of the database entry for this particular completed form.

In a second example that advantageously utilizes the techniques disclosed in this application, a user similarly obtains an image of a form by scanning the form. The form is preferably blank, but in some embodiments can also be filled out. The user views the image of the form using a computer. The user moves a cursor to a first field of the form, and the computer system automatically displays a predicted location of the field, including a bounding box that represents the boundary of the field. The computer system further predicts the field name/label based on text in the document. The user clicks on the field to indicate that he wants to digitize the field. In some embodiments, the user can interactively modify the size of the bounding box that represents the extent of the field, and can change the name/label of the field. Once finalized, the user can cause the field information (e.g., the bounding box coordinate, the bounding box location, the name/label of the field, etc.) to be written to a database.

The user now wishes to digitize a table of the form. The user depresses a click/select indicator of a mouse outside one corner of the table and moves the cursor to outside the opposite corner of the table, which causes a table indicator box to be drawn such that the box encloses the table. The computer system predicts the locations of fields of the table, as well as field names/labels for the fields. The user indicates that he wants to digitize the fields of the table. In some embodiments, the user can interactively modify the size of the bounding boxes that represent the extents of the fields of the table, and can change the name/label of the fields of the table. Once finalized, the user can cause the field information (e.g., the bounding box coordinates, the bounding box locations, the name/label of the fields, etc.) for fields of the table to be written to a database.

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

Further, in this description the term "cause" and variations thereof refer to either direct causation or indirect causation. For example, a computer system can "cause" an action by sending a message to a second computer system that commands, requests, or prompts the second computer system to perform the action. Any number of intermediary devices may examine and/or relay the message during this process. In this regard, a device can "cause" an action even though it may not be known to the device whether the action will ultimately be executed.

Note that in this description, any references to sending or transmitting a message, signal, etc. to another device (recipient device) means that the message is sent with the intention that its information content ultimately be delivered to the recipient device; hence, such references do not mean that the message must be sent directly to the recipient device. That is, unless stated otherwise, there can be one or more intermediary entities that receive and forward the message/signal, either "as is" or in modified form, prior to its delivery to the recipient device. This clarification also applies to any references herein to receiving a message/signal from another device; i.e., direct point-to-point communication is not required unless stated otherwise herein.

FIGS. 1A-D are flow diagrams illustrating an example process of determining a location of a field of a form based on an image of the form, consistent with various embodiments. At block 110, a computer system receives binary data that represents an image of a form, such as form 300 of FIG. 3. The binary data can be created in any compatible manner, such as by scanning the form, taking a photo of the form, etc. The binary data can be from a scanner, camera, etc. that is coupled to and/or integrated with the computer system, can be from a remote computer system, can be from a mobile device such as a smart phone or tablet, etc. The remote computer can have a scanner, camera, etc. that is coupled to and/or integrated with the remote computer system, and that can be used to obtain an image of a form based on a scan or photograph of the form. In some embodiments, the image includes meta-data that identifies visual data, such as meta-data that identifies locations of lines, fields in the form, etc. In other embodiments, the image includes no meta-data that identifies visual data, such as locations of lines, locations and/or extents of fields in the form, etc. In such embodiments, the process of FIGS. 1A-D advantageously is able to extract visual data from the image without relying on or needing meta-data that identifies or helps to identify the visual data.

At block 130, the computer system creates a data structure to represent the form. In some embodiments, the data structure is structured to enable efficient location of fields based on interactive user input. In one example usage scenario, a user views an image of a form during a process of digitizing the form. When the user moves a cursor over a possible location of a field of the form, the data structure can be structured to enable a fast and efficient prediction and display of a possible field. Digitizing a form can include storing data related to fields of a form, such as locations of fields, boundaries of fields, labels of fields, etc., at a data structure to facilitate automated or semi-automated extraction of data written/typed/etc. at the fields of a filled-out version of the form.

Figure 2:
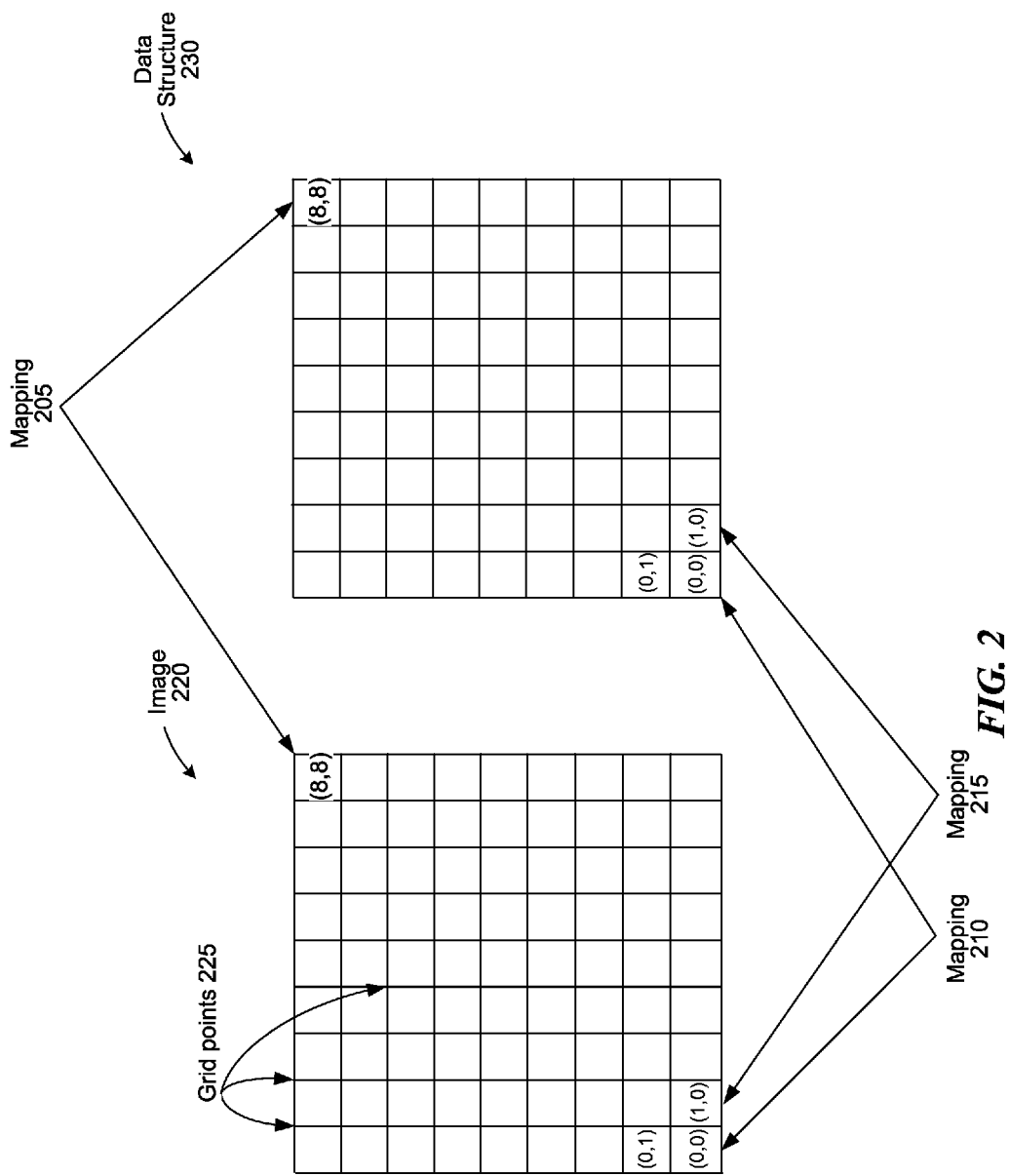
FIG. 2 is diagram that illustrates a mapping between an image of a form and an associated data structure, consistent with various embodiments.

In some embodiments, the data structure is organized so that adjacent portions of an image map to adjacent elements of a data structure. For example, data structure 230 of FIG. 2 is organized so that adjacent "portions" of image 220 map to adjacent elements of data structure 230. Each square of image 220 represents a "portion" of image 220, and each square of data structure 230 represents an element of data structure 230. Each corner of each square of image 220, such as the square at index (0,0), or the square at index (8,8), is coincident with a grid of image 220. Grid points 225 identifies examples of three grids, also referred to as grid points.

As can be seen at mapping 210 and mapping 215, two adjacent "portions" of image 220 (e.g., portion (0,0) and portion (1,0)) map to adjacent elements of data structure 230 (e.g., element (0,0) and element (1,0)).

Blocks 132-138 represent a flow diagram to perform the operation of block 130. At block 132, the computer system analyzes the image of the form. Features of a data structure can be determined by a computer system based on the analysis of the image. For example, features of a data structure, such as the number of elements of the data structure, the organization of the data structure, the data associated with each element, etc. can be determined based on an analysis of the image.

In some embodiments, the computer system determines a data structure based on a grid that the computer system determines based on the image of the form. A grid can define the "portions" of an image. In FIG. 2 for example, grid points of image 220, such as grid points 225, define "portions" of image 220, where each non-overlapping square of image 220 represents one of the "portions" of image 220.

The computer system can determine the size of a grid based on an analysis of the image. For example, a grid can be set based on the size of a pixel of the image (e.g., grid=1 pixel×1 pixel), the size of a grouping of pixels of the image (e.g., grid=3×3 pixels), a measured portion of the image (e.g., grid=0.1 mm×0.1 mm), a percentage of a size of the image (e.g., the X grid=1% of the X dimension of the image, and the Y grid=1% of the Y dimension of the image), etc. When the grid is a pixel, one of the "portions" of image 220 includes data of the pixel that overlaps with one of the squares of image 220. When the grid is group of 3×3 pixels, one of the "portions" of image 220 includes data of the 9 pixels that overlap with one of the squares of image 220. Etc.

While the current discussion focuses on a regular grid whose grid points define squares, a grid can have various characteristics that are determined based on any of various other data. For example, a grid can define a set of non-overlapping rectangles, such as when the grid is 2 pixels by 1 pixel. As another example, the grid can be irregular. For example, the grid of FIG. 7 can be coincident with the line intersections of FIG. 7, where the lines and associated line intersections are irregularly spaced.

The computer system can determine a data structure (block 134) based on results of the analysis of block 132. In some embodiments, the computer system determines the data structure to enable data of each "portion" of the image to map to a different element of the data structure, and to enable adjacent "portions" of the image map to adjacent elements of the data structure. Data structure 230 of FIG. 2 is an example of such a data structure.

The computer system can determine any of various types of data structures, such as a linked list, an array, a hash table, etc. Further, the data structure can be based on any of various attributes of the image, such as the color(s) of the image, the size of the image, the resolution of the image, etc.

In some embodiments, two elements of a data structure are considered to be adjacent when the index of each of the elements differs by one unit. For example, in data structure 230, the index is an ordered pair. For data structure 230, two elements are considered adjacent when one number of the ordered pair differs by one unit, and the other number of the ordered pair is the same. For example, element (0,0) is adjacent to element (1,0) because one number of the ordered pair (the first number in this example) differs by one unit, and the other number of the ordered pair is the same. Similarly, element (0,0) is adjacent to element (0,1) because one number of the ordered pair (the second number in this example) differs by one unit, and the other number of the ordered pair is the same.

As discussed above, the data structure can be organized so that the relative locations of the "portions" of the image are reflected in the organization of the data structure. When a document, such as a form, is scanned, photographed, etc., the resulting image has a certain resolution. For example, the resolution of the image can be 2048 pixels by 1536 pixels, for a total of 3,145,728 pixels (or 3.1 Megapixels). In some embodiments, the computer system determines the grid size so that the grid matches the size of a pixel. In such an embodiment, each pixel of the image is associated with a particular row and column of the 2048 pixel×1536 pixel image of the form. In this example, a pixel located at numbered pair (0,0) is located at the bottom-left of the image, and a pixel located at (2047,1535) is located at the top-right of the photo. As is shown in FIG. 2, adjacent portions (0,0) and (1,0) of image 220 map to adjacent elements (0,0) and (1,0) of data structure 230. When the portion is a pixel, adjacent pixels (0,0) and (1,0) of the image map to adjacent elements (0,0) and (1,0) of the data structure.

At block 136, the computer system identifies a line segment. Some algorithms for predicting fields in a form use locations of lines on the form to predict or determine a location of a field, and a boundary of the field. The location of the field is where the field is located on the image of the form. The location can be any location associated with the field, such as the location of the middle of the field, the bottom left corner of the field, the location of a line that defines a boundary of the field, such as a bottom line of a field, etc. The boundary of the field defines an area on the image where a user is expected to input (e.g., write, type, etc.) a value for the field.

Some embodiments of the process of FIG. 1 are interactive, in that user input is required during the process. In preparation for an interactive session, a computer system can pre-populate a data structure with data derived from an image to be digitized to enable a faster and more efficient interactive user experience. Some embodiments advantageously load data of the form in memory in preparation for an interactive session. Loading the data of the form in memory, such as by loading a data structure that contains data of the form, and organizing the data to efficiently support an interactive session, can enable a much faster and responsive interactive user experience.

Some embodiments of the process of FIG. 1 use locations of line segments of the form in predicting or determining field locations and boundaries. In order to facilitate an improved interactive user experience, qualifying line segments can be stored in a data structure that is organized/structured to efficiently support an interactive session. Returning to block 126, in some embodiments, the computer system identifies all visible line segments of a form that meet a certain criteria. The computer system does this by analyzing the binary data of the image of the form to identify line segments that are visible on the form. Identifying line segments is well known in the art, with one example of an algorithm for doing so being a Hough Line Transform, which can be found at http://docs.opencv.org/doc/tutorials/imgproc/imgtrans/hough_lines/hough_lines.html. A second example of a line extractor can be found at http://docs.opencv.org/master/db/d73/classcv_1_1LineSegmentDetector.html.

As line segments are found, they can be evaluated to determine if they meet certain criteria. For example, lines that do not extend a predetermined distance may be filtered out, lines that do not run sufficiently or substantially straight in the X or Y dimension may be filtered out, lines that are or are not of a certain color or color range may be filtered out, lines that are or are not of a certain style (such as a dashed line) may be filtered out, etc. In some embodiments, a line is deemed to run sufficiently straight when its length in the primary direction in which the line runs is at least 600% of the length that it traverses in the non-primary direction. For example, a line that extends 3 inches in the X dimension may be filtered out if the difference between the maximum and minimum Y coordinates of the line segment is more than 0.5 inches.

In some embodiments, once a line segment is determined and passes all line segment filters, the line segment is mapped to a data structure element (block 138). As discussed above, data of a "portion" of an image that is determined based on a grid can be mapped to an element of a data structure. Once the line segment is determined, the computer system determines which "portions" of the image the line passes through, and maps the line to the elements that are mapped to those "portions." For example, where the grid is a pixel and a line runs through 1000 pixels, the line can be mapped to each of the 1000 pixels. The data stored at each element can include, e.g., a link to a data structure element that includes the data of the line segment, information regarding the portion of the line segment that passes through the portion of the image that maps to the element, etc.

In some embodiments, this process is repeated for all line segments of the form, such that, once completed, the data structure includes line segment information for all line segments that met the criteria and were not filtered out. Once the process is complete, the data structure of such embodiments includes information regarding all the line segments that meet the criteria, thereby advantageously enabling an enhanced interactive user experience.

At block 150, the computer system predicts a location of a field of the form. Any computing device, such as a remote computer system, a mobile device, etc. can be used to perform the operation of block 150. A mobile device can be any mobile computing device, such as a laptop computer, a smart phone, a tablet, etc. In some embodiments, the operations of all blocks of FIG. 1 are performed by a computer system. In other embodiments, the operations of blocks 110-138 are performed by a server, and the operations of blocks 150-195 are performed by a computing device, such as a laptop computer, a desktop computer, a smart phone, a tablet, etc. In other embodiments, various computers perform the operations of the various blocks of FIG. 1A-D.

Blocks 152-158 represent a flow diagram to perform the operation of block 150. At block 152, a computer system determines a location of a cursor. In some embodiments, when a user begins an interactive session to digitize a form, the user views an image of the form. The image of the form can be displayed by any of various applications that can display images, such as an image viewer, a photo viewer, a PDF viewer, a web browser, a word processor, etc. The process of digitizing the form includes identifying relevant fields of the form that a user may want to automatically extract from a filled out version of the form. The user guides a cursor over a field, in this example field 305 of FIG. 3.

When the cursor hovers over and/or stays substantially at a selected location on the image, the computer system determines the location of the cursor, such as the location of the cursor on the image. Based on the location of the cursor, the computer system determines a "portion" of the image (block 154). The "portion" of the image can be a portion of the image that is located at the location of the cursor. For example, when the grid of image 300 of FIG. 3 is a pixel and the user hovers a cursor over field 305, the computer system determines the coordinate of the cursor. Based on the coordinate of the cursor, and based on the size of the grid (in this example, a pixel), the computer system determines that the coordinate of the cursor intersects a particular pixel of the image (i.e., the pixel being the "portion" of the image). In various embodiments, the portion of the image that is determined at block 154 can be a grid, multiple grids, part of the image that is within a defined distance the location of the cursor, etc.

At block 156, the computer system determines a location of a field based on a location of nearby line segments, and at block 158 determines an extent of the field. In a first example, a field is encircled by line segments. An example of such a field is field 405 of FIG. 4A, where a user would enter the "MAKE" of an automobile on a DMV form. As discussed above, the location of the field can be any location associated with the field, such as the location of the middle of the field, the bottom left corner of the field, the location of a line that defines a boundary of the field, the location of an extent of the field, etc.

In this example, the location of the field is the location of the line segment at the bottom of the field. Further, the data structure of block 130 is organized so that adjacent portions of an image map to adjacent elements of a data structure to enable a fast and efficient prediction and display of a possible field. In other words, when a first "portion" of the image is located "below" a second "portion" of the image, the element that maps to the first portion will be "below" the element that maps to the second portion. For example, in FIG. 2, the portion of image 220 at index (0,0) is "below" the portion of image 220 at index (0,1). Accordingly, the element of data structure 230 at index (0,0) is also "below" the element at index (0,1).

Based on the cursor location of block 152, and the associated "portion" of the image, the computer system accesses a data structure element associated with the "portion" of the image to determine if the element is mapped to a line segment. In this example, when the element is mapped to a line segment, the location of the line segment is determined and the location of the field is based on the location of this nearby line segment (block 156). The location of the field can be based on or can be any location characteristic of the line segment, such as a coordinate of a predetermined point on the line segment (e.g., the middle, left end, right end, etc. of the line segment), a location of the line segment, a location of the "portion" of the image that maps to the line segment, etc.

When the element is not mapped to a line segment, the computer system begins walking "down" elements of the data structure to find a line segment that is "below" the element. In this example, the index of an element of the data structure has the format index(X,Y). The computer system can walk "down" elements of the structure by decrementing Y. For example, if the starting element has an index of (1000,900), the next element when walking "down" elements of the data structure will have an index of (1000,899). As the computer system walks down elements of the data structure, it determines whether the next lower element maps to a line segment. If not, the computer system continues to the next lower element. Once the computer system identifies an element that maps to a line segment, the computer system in this example determines the location of the line segment and bases the location of the field on the location of this nearby line segment (block 156).

Once the "lower" line segment is identified, the computer system determines an extent of the field (block 158). In this first example, the computer system walks "up" elements of the data structure until it finds a line segment "above" the lower line segment. The computer system then walks "left" and "right" until it finds line segments that are "left" and "right" of the starting element. When the four line segments form a box, the extent of the field is based on the four line segments. For example, the extent of the field can be defined as the box formed by the four line segments, or by taking the box formed by the four line segments and over sizing or under sizing the box to determine the extent and/or boundary of the field.

In a second example, a field is bounded on two or three sides by line segments. Examples of such fields include fields 410 and 415 of FIG. 4A. In such examples, the location of nearby line segments and the location of the field are determined in a manner similar to the first example (block 156). However, when searching in a direction where the field is not bounded by a line, no line is found. When the computer system is in the process of determining the extent of the field (block 158), each discovered bounding line determines an extent of the field in one dimension. The extent of the field in directions where no bounding line was discovered is determined based on the end points of the bounding lines. For fields 410 and 415, the left extent is set to be coincident to the left ends of the top and bottom bounding line segments. For field 415, the right extent is similarly set to be coincident to the right ends of the top and bottom bounding line segments.

In a third example, a field is bounded on one side by a line segment. An example of such a field is field 305 of FIG. 3. In such an example, the location of nearby line segments and the location of the field are determined in a manner similar to the first example (block 156). However, when searching in a direction where the field is not bounded by a line, no line is found in that direction. When determining the extent of such a field (block 156), a computer system can set the left and right ends of the field to be coincident with the left and right ends of the discovered bounding line segment.

The top of the extent of the field can be determined in any of several ways. For example, the height can be determined based on the height of text that is associated with the field. For field 305, the top extent of the field can be set based on the text to the left of the field, "Child's Name," which is the text associated with field 305. The height of the field can be set equal to the height of the associated text, can be set to be a multiple of the height of the associated text (e.g., 1.5 times the height of the associated text), etc. As another example, the height can be determined based on the average or median height of text in the document. For example, the height of the field can be set equal to the median or average height of text in the document, can be set to be a multiple of the median or average height of the text in the document (e.g., 1.5 times the height of the median or average text height), etc.

Figure 5:
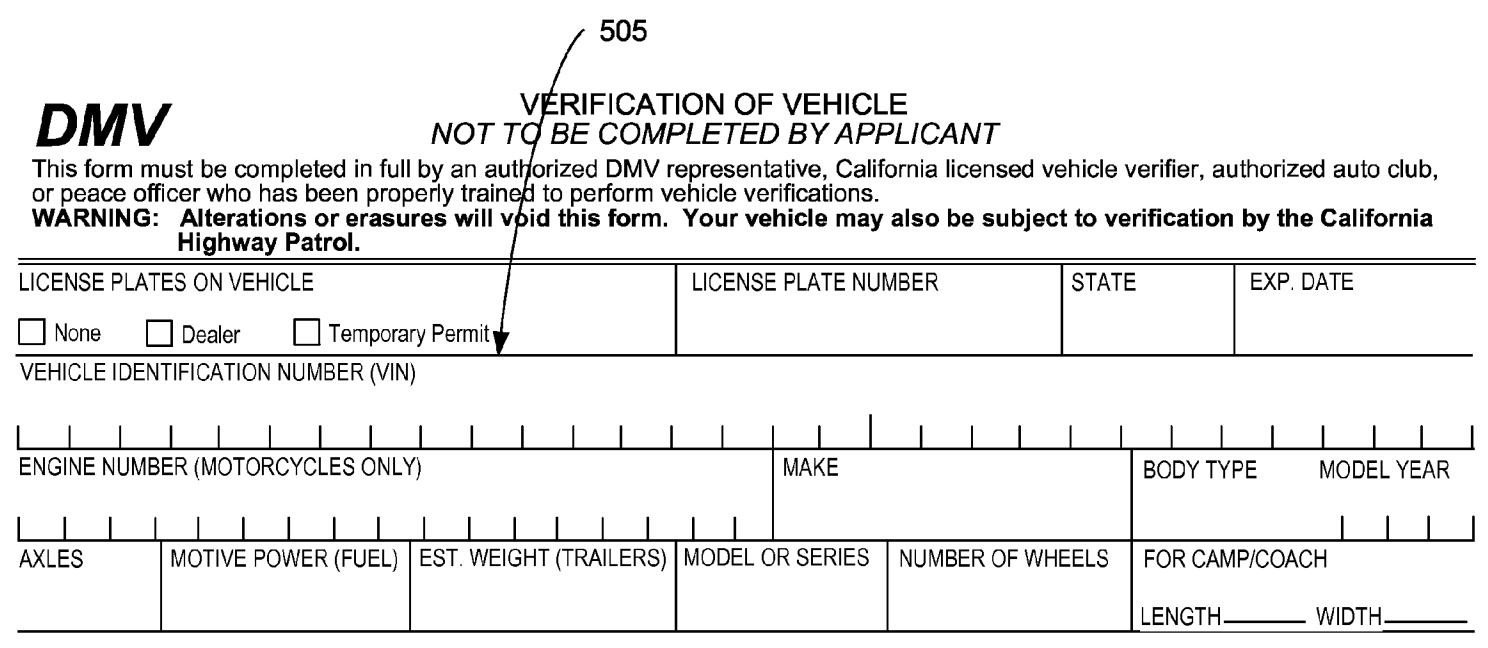

In a forth example, a field includes extraneous line segments. An example of such a field is field 505 of FIG. 5. Field 505 includes line segments to denote where each character should be placed. In such a case, a detected nearby line segment can be filtered based on certain criteria. The filtering can happen prior to block 156. For example, when the line segments that form the top and bottom extents of field 505 are located, the Y dimension distance between the two line segments can be determined. When searching for line segments in the left or right direction, any detected vertical line segments that have a length less than a predetermined portion of the distance between the top and bottom extent line segments, such as 25% or 50% of the distance, can be filtered. Once the extraneous line segments are filtered, field 505 is determined in a manner similar to field 415.

In a fifth example, a field is bounded on one side by a line segment, and on an opposite side by one or more line segments whose lengths are different than or are offset from the boundary line segment of the first side. Examples of such fields include fields 310 and 315 of FIG. 3. In such cases, where one or more line segments are found in the vertical direction (block 156) which do not match the length and/or do not line up with the bottom line segment (e.g., the upper line segment is the same length, but is shifted in the left or right directions as compared to the bottom line segment), any of various techniques can be used to determine the upper extent of the field (block 158). For example, the upper extent of the field can be determined in a manner similar to the third example where the extent is based on the height of text in the document. As another example, the upper extent of the field can be set to be coincident with the line segment(s) found in the vertical direction, or to be coincident with the lowest line segment found in the vertical direction. When determining whether two line segments have the same length, or are shifted, the comparison between the line segments can include an error threshold, which can be a predetermined absolute amount, can be a predetermined relative amount, etc. For example, the error threshold can be 0.1 inches, can be 10% of the length of the line segment, etc.

In a sixth example, multiple fields are bounded on the top and bottom by line segments that extend the length of the multiple fields, and are not bounded on the left or right. An example of such a field is field 420 of FIG. 4A, which is bounded on the top and bottom by line segments that extend past the fields for APPLICANT'S SIGNATURE, for PRINTED NAME, and for DATE. In such a case, a computer system can determine the left and right extent of each field based on text associated with the fields or by the ends of the top and bottom boundary line segments (block 158). For example, a computer system can determine that multiple text fields are associated with the top and bottom boundary line segments based on spacing between the text. A computer system can evaluate the space between words, and when space between some words associated with a line segment or field exceeds a predetermined threshold, the computer system can determine that the large spacing indicates a new field. The threshold can be an absolute amount (e.g., a spacing more than 0.25 inches in the original image or when printed), can be a relative amount (e.g., a spacing more than two times the height of the text, more than 6 times the median spacing between words, etc.), among other amounts. Line segments 425-440 of FIG. 4B are examples of line segments that represent the left and right extents of the multiple fields of field 420.

In a seventh example, a field is part of a table. Examples of such fields include fields 605 and 620 of table 600 of FIG. 6, and field 705 of table 700 of FIG. 7. In such cases, a table can be automatically or semi-automatically detected. When tables 600 or 700 are automatically detected, a user can place a cursor over a field of the table, such as field 605 or field 705, and a computer system can determine the location of the cursor (block 152). The computer system can determine a portion of the image based on the cursor location (block 154) in a manner similar to some of the above examples. When determining a field based on locations of nearby line segments (block 156), which can be done in a manner similar to the first example where the field is encircled by line segments, a computer system can continue to search in the upper, lower, right, and left directions and can determine, based on the location of detected line segments, that field 605 is part of table 600, or that field 705 is part of table 700. For example, when the computer system searched in the right direction, the computer system can detect a series of similarly sized line segments. By doing similar searches in the left, upper, and lower directions the computer system can detect other line segments of the table in a similar manner, and, based on the detected line segments, can determine a location and extent of the table.

When tables 600 or 700 are semi-automatically or interactively detected, a computer system can receive input from a user that indicates an existence and location of the table. For example, when determining a location of a cursor (block 152), a computer system can also determine that a user drew a box with a mouse or other device to indicate a table. For table 600/700, a user can click slightly below and to the left of the bottom left corner of table 600/700 (e.g., below and to the left of field 615/715), can continue to depress the click indicator while moving the cursor to slightly above and to the right of the top right corner of table 600/700 (e.g., above and to the right of field 610/710), where he releases the click indicator, thereby indicating a first and a second corner of a rectangle that indicates an extent of a table, in this example table 600/700. The computer can analyze line segments that are within the indicated drawn bounding rectangle to determine both the location and extent of table 600/700, as well as the location and extent of each of the fields of the table, such as field 605/705 (blocks 156 and 158). In table 600/700, each field is encircled by line segments, and the location and boundary of field 605/705 can be determined in a manner similar to the first example where a field is encircled by line segments.

In some embodiments, X and Y dimensions of table 600/700 are determined, and lines that run less than a predetermined amount, such as 75% of a table dimension, are filtered. For example, if a line runs in the X dimension less than 75% of the X dimension of the table, or if a line runs in the Y dimension less than 75% of the Y dimension of the table, the line can be filtered out.

At block 170, a computer system predicts a label for the field.

Blocks 172-176 represent a flow diagram for performing the operation of block 170. A computer system can select a field based on a location of a cursor on the image of the form (block 172). The location of the cursor at block 172 can be the same location of the cursor at block 152, or can be a different location, for example, due to the cursor moving slightly. The field can be the field of block 156. The computer system can run OCR on part or all of the image to determine text of the image (block 174). OCR can be run on the contents of a field when a user indicates a selection of the field, can be run on the entire document during creation of a data structure at block 130, or can be run at any of various other times. The contents of the field can be defined by the extent of the field as determined at block 158, by under sizing or over sizing the extent of the field of block 158, e.g., over sizing the extent of the field by 50% of the height of the field, or by another method.

A label for a field can be predicted in any of various ways (block 176). For example, the label can be predicted based on text that is located nearby to or at the field. As an example, prediction of labels for fields 305 and 310 of FIG. 3 can be based on an analysis of text/field patterns in a row of document 300 that includes the field. A computer system can determine that the text CHILD'S NAME is followed by field 305, which is followed by CHILD'S SOCIAL SECURITY #, which is followed by another field. The computer system, based on this pattern of text/field/text/field, can predict that the first text (i.e., CHILD'S NAME) is a label for the first field (i.e., field 305), and that the second text is a label for the second field.

As another example, a prediction of the label for field 315 can be similarly based on an analysis of text/field patterns in a row of document 300. A computer system can determine that the text PARENTS ARE: is followed by a first field, which is followed by MARRIED, which is followed by a second field, which is followed by SINGLE, which is followed by a third field, which is followed by SEPARATED, which is followed by a forth field, which is followed by DIVORCED. In this example, with there being text to both the left and right of each field, the computer system can additionally base a prediction of a label for a field on text punctuation. In this case, based on the first text ending in a colon (i.e., ":"), the computer system can predict that the text that follows each field is the label for the field, and that the label for field 315 is DIVORCED.

As yet another example, a prediction of the label for field 405 of FIG. 4A can be based on text that is located within the bounds of the field. A computer system can determine that the text MAKE lies within the boundary of field 405, and can predict that MAKE is the label for field 405. The bounds/boundary of the field can be defined by the extent of the field as determined at block 158, by a sizing of the extent of the field of block 158, or by another method. As yet another example, a prediction of a label for field 420 of FIG. 4A can be based on text that is located within the bounds of the multiple fields of field 420, as is represented by line segments 425-440 of FIG. 4B. In this example, a label for the first of the multiple fields of field 420 is APPLICANT'S SIGNATURE, a label for the second of the multiple fields is PRINTED NAME, and a label for the third of the multiple fields is DATE.

Figure 6:
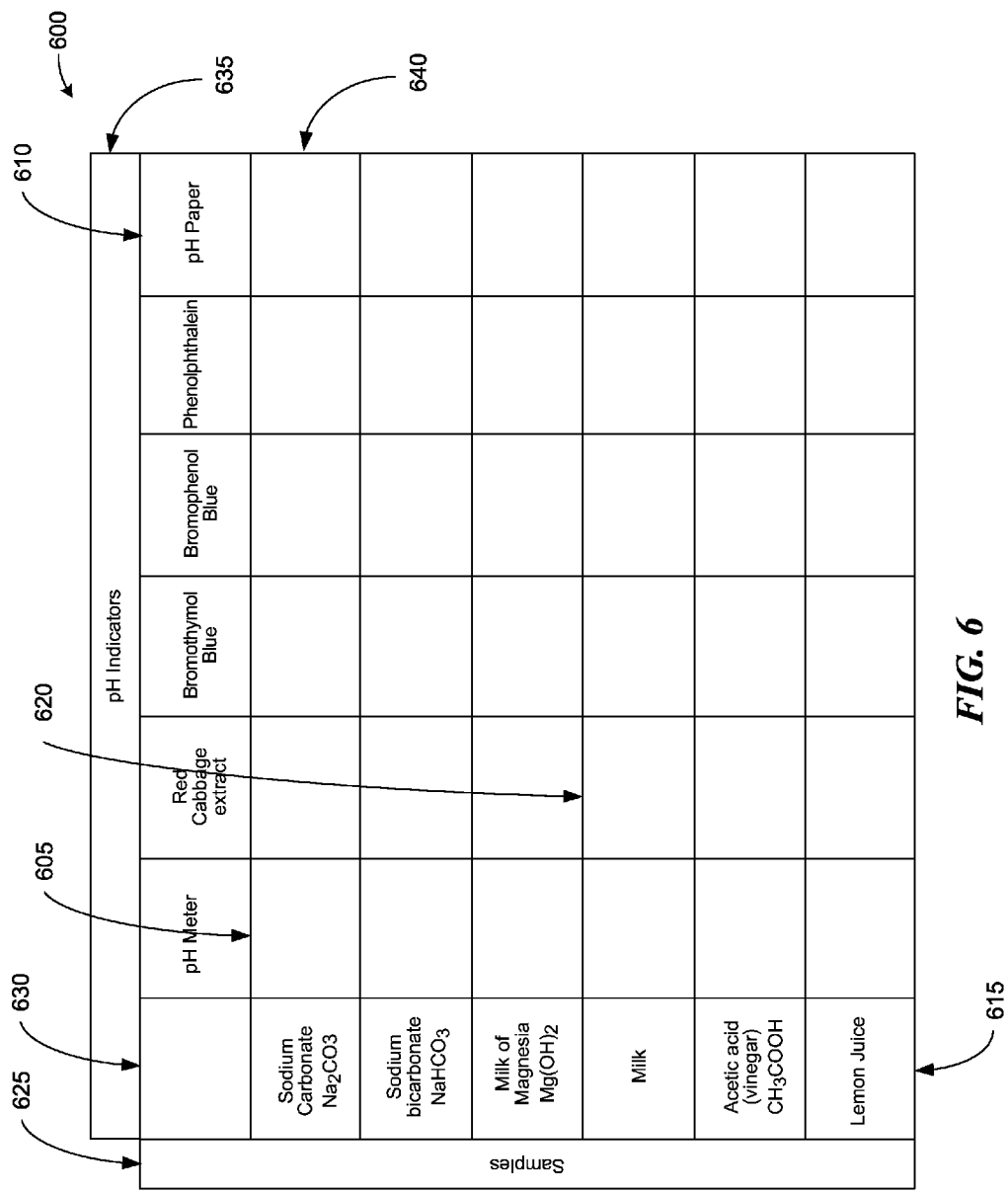
FIG. 6 is an illustration of a pH Indicator data table, consistent with various embodiments.

A label for a field in a table, such as fields 605 or 620 of table 600 of FIG. 6, or field 705 of table 700 of FIG. 7, can be based on text in the outermost row(s) and column(s) of the table. In the example of FIG. 6, area 625, which includes the text SAMPLES, and area 635, which includes the text PH INDICATORS, are not part of table 600. The line segments that define the extents of areas 625 and 635 and do not define the extent of table 600 (i.e., the "625/635 line segments"), are not part of table 600 in this example and can be filtered in any of several ways. For example, when a user draws a box using a mouse or other device to indicate a table, the user can draw the box so that it does not include the entirety of areas 625 and 635. A computer system can filter the 625/635 line segments based on their not being fully contained within the drawn box.

In another example, a user draws the box so that it includes all of areas 625 and 635. In this example, a computer system can filter the 625/635 line segments based on the Y-dimension of area 625, and the X-dimension of area 635, not matching the X and Y dimensions of fields of table 600. In other words, the computer system can analyze fields that it finds within the drawn table indication box. When the computer system finds a number of abutting fields that are laid out in a table configuration, it can keep those fields, and it can filter out fields that do not match the table pattern. In this example, the 625/635 line segments that define boundaries of area 625 will be filtered out due to the Y dimension of area 625 not matching the Y dimension of fields of table 600. Additionally, the 625/635 line segments that define boundaries of area 635 will be filtered out due to the X dimension of area 635 not matching the X dimension of fields of table 600. This filtering will leave line segments that form the boundaries of the fields that form the rows and columns of the table.

Contents of fields that are in the outermost row(s) and column(s) can be analyzed to predict labels for the fields of table 600 (block 176). A computer system analyzes table 600 and determines that fields of the left most column and top most row of table 600 include text. The computer system can base the labels of the fields of table 600 on the text found in these fields. For example, a label of field 605 can be set to "PH METER" "SODIUM CARBONATE NA2CO3", with "PH METER" being predicted as part of the label for all fields in column 630 that are below the top most row, and with "SODIUM CARBONATE NA2CO3" being predicted as part of the label for all fields of row 640 to the right of the left most column. As a second example, a label of field 620 can be "RED CABBAGE EXTRACT" "MILK OF MAGNESIA MG(OH)2".

Labels for fields of table 700 are handled in a manner similar to the fields of table 600. In the example of FIG. 7, a label of field 705 can be set to "NEW CASES" "MALARIA", with "NEW CASES" being predicted as part of the label for all fields in column 720 below the top-most row of table 700, and with "SODIUM CARBONATE NA2CO3" being predicted as part of the label for all fields in row 725 to the right of the left most column of table 700.

At block 190, the computer system displays a boundary that represents the field. The boundary can be the extent determined at block 158 of FIG. 1C, can be the extent oversized or undersized by a predetermined amount, etc. For example, the boundary can be determined by oversizing the extent of the field by 0.25 inches, by undersizing the extent of the field by 10% of the height of the extent, etc. The boundary can be displayed in response to the user placing the cursor at a location of the field, by the user hovering the cursor or keeping the cursor substantially still over the field, etc.

At block 195 the user digitizes the form. Digitizing a form can include, for example, storing data related to fields of a form, such as locations of fields, boundaries of fields, labels of fields, etc., at a data structure, such as to facilitate automated or semi-automated extraction of data written/typed/etc. at the fields of a filled-out version of the form. The data structure can be the data structure of block 130, or can be another data structure. For example, the computer system can create a data structure element for a field, such as for field 305 of FIG. 3. The data structure element can include members. For example, as part of digitizing the form, the computer system can create members of the data structure element. For example, the computer system can create a member that defines the boundary of the field, another member that defines the field label, another memory that stores the location of the field, etc. The data structure of block 195 can be stored to disk for future use, such as when filled out versions of the form are received and the filled out values of the various fields are extracted from the form and added to a database.

Figure 8:
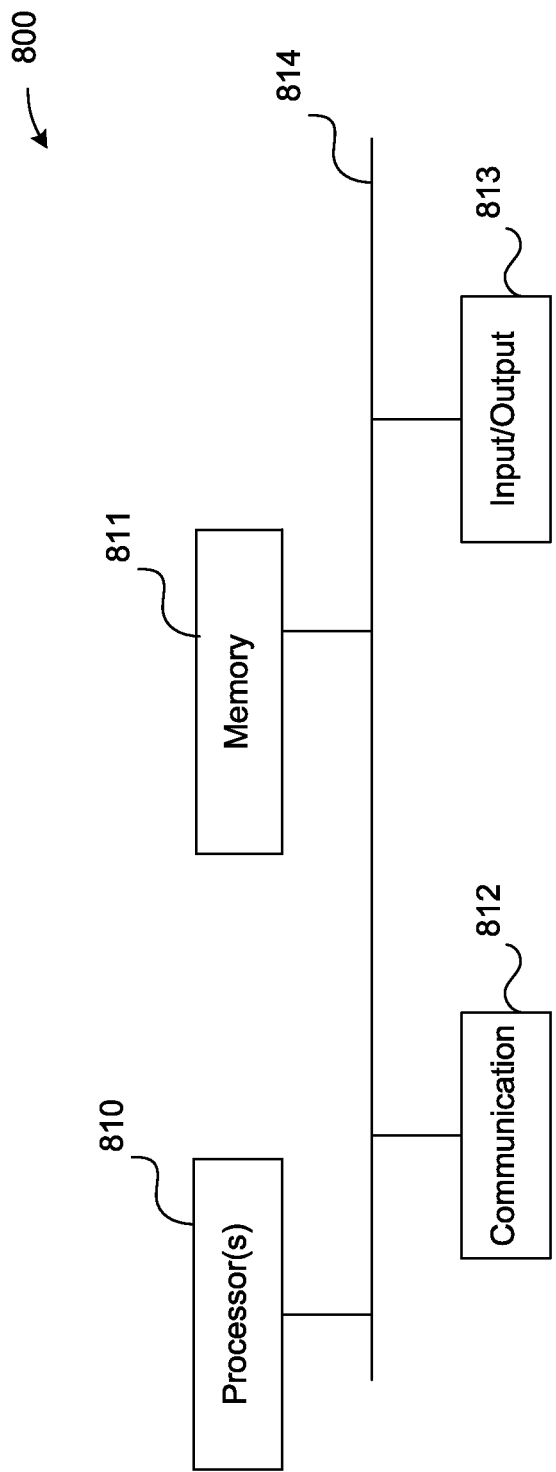
FIG. 8 is a block diagram illustrating an example of a processing system in which at least some operations described herein can be implemented, consistent with various embodiments.

FIG. 8 is a high-level block diagram showing an example of a processing device 800 that can represent a system to run any of the methods/algorithms described above. A system may include two or more processing devices such as represented in FIG. 8, which may be coupled to each other via a network or multiple networks. A network can be referred to as a communication network.

In the illustrated embodiment, the processing device 800 includes one or more processors 810, memory 811, a communication device 812, and one or more input/output (I/O) devices 813, all coupled to each other through an interconnect 814. The interconnect 814 may be or include one or more conductive traces, buses, point-to-point connections, controllers, adapters and/or other conventional connection devices. Each processor 810 may be or include, for example, one or more general-purpose programmable microprocessors or microprocessor cores, microcontrollers, application specific integrated circuits (ASICs), programmable gate arrays, or the like, or a combination of such devices. The processor(s) 810 control the overall operation of the processing device 800. Memory 811 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 811 may store data and instructions that configure the processor(s) 810 to execute operations in accordance with the techniques described above. The communication device 812 may be or include, for example, an Ethernet adapter, cable modem, Wi-Fi adapter, cellular transceiver, Bluetooth transceiver, or the like, or a combination thereof. Depending on the specific nature and purpose of the processing device 800, the I/O devices 813 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method for predicting a location of a field on a form based on an image of the form, the method comprising:
    receiving, by a computer system, binary data that represents the image of the form;
    creating a data structure based on the binary data by:
        analyzing the binary data, by the computer system, to determine a plurality of grid points, wherein the plurality of grid points define a plurality of rectangular boxes, and wherein each corner of each of the rectangular boxes is coincident with a grid point of the plurality of grid points;
        creating the data structure, by the computer system, so that each element of the data structure maps to a different one of the rectangular boxes;
        identifying, by the computer system, a plurality of visible line segments of the image by executing an image analysis algorithm that reads the binary data, that identifies visual data based on the binary data, and that analyzes the visual data to determine which of the visual data represent line segments; and for each line segment of the identified plurality of visible line segments:
mapping the line segment, by the computer system, to a selected element of the data structure based on a determination that the line segment intersects a selected rectangular box that maps to the selected element;

identifying the location of the field of the form by:
determining, by the computer system, a location of a cursor being displayed at a display of the computer system after a user caused the cursor to move;
determining, by the computer system, that the location of the cursor intersects a portion of the image that is being displayed at the display, and that maps to a first rectangular box;
identifying a nearby line segment of the visible line segments, by the computer system, based on a proximity of a nearby rectangular box, that is mapped to the nearby line segment, to the first rectangular box;
determining the location of the field based on a location of the nearby line segment; and
determining an extent of the field based on an analysis of other nearby line segments; and determining coordinates of a rectangular box that represents the field based on the location of the field and the extent of the field; and displaying the rectangular box at the display.

2. The method of claim 1, wherein each of the rectangular boxes is associated with a different pixel of the image, and wherein a rectangular box of the plurality of rectangular boxes is a square.

3. The method of claim 1, further comprising:
determining to digitize the field based on an indication by a user to create the field; and
digitizing the field by:
writing coordinates that define a boundary of the field to a database that is associated with the image; and
determining a label for the field by:
executing an optical character recognition (OCR) algorithm on a portion of the image that is determined based on the coordinates of the rectangular box that represents the field;
based on results of said executing the OCR algorithm, displaying a suggested label for the field; and
based on an indication to use the suggested label, writing the suggested label to the database.

4. The method of claim 3, wherein the indication to use the suggested label is a selection of the rectangular box made by the user clicking a mouse, and wherein the suggested label is displayed as an autocomplete in response to the user typing a character to indicate the label for the field.

5. The method of claim 3, further comprising:
receiving a second image of a filled out version of the form;
accessing the database to determine the coordinates of the rectangular box that represents the field;
executing the OCR algorithm on a portion of the second image that is determined based on the coordinates;
determining a value of the field based on said executing the OCR algorithm on the portion of the second image; and
writing the value to the database to associate the value with the label.

6. The method of claim 1, wherein said determining the extent of the field includes determining that there are no other nearby line segments that indicate the extent of the field, wherein said determining the extent of the field includes determining an average or median height of text of the form, and wherein one dimension of the extent of the field is based on results of said determining the average or the median height of the text.

7. The method of claim 1, wherein said determining the extent of the field includes determining the extent of the field based on other nearby line segments that indicate the extent of the field.

8. A method comprising:
receiving, by a computer system, binary data that represents an image of a form;
executing an image analysis algorithm, by the computer system, that reads the binary data, that identifies visual data based on the binary data, and that analyzes the visual data to determine which of the visual data represent visual line segments;
creating a data structure, by the computer system, based on an identification of the visual line segments;
receiving data, by the computer system, that indicates a location of a cursor on a display and that indicates a particular location of the image;
predicting a location and a boundary of a field of the form, by the computer system, by:
accessing a first element of the data structure, based on a location indicated by a cursor, to identify a visual line segment to use in a determination of a predicted location of the field; and
accessing a second element of the data structure, based on a location of the identified visual line segment or the location indicated by the cursor, to obtain information regarding other visual line segments to use in a determination of a predicted boundary of the field;
causing the predicted boundary of the field to be displayed at a location of the image determined based on the predicted location of the field;
executing an optical character recognition (OCR) algorithm on a portion of the image that is determined based on coordinates of the predicted boundary;
determining a predicted label of the field based on results of said executing of the OCR algorithm and based on a character input by a user to indicate a label of the field;
causing the predicted label to be displayed;
in response to receipt of data that indicates an intent of the user to create the field, writing data that indicate the predicted boundary and the predicted label to a database that is associated with the image;
receiving a second image of a filled out version of the form;
accessing the database to determine the coordinates of the predicted boundary;
executing the OCR algorithm on a portion of the second image that is determined based on the coordinates;
determining a value of the field based on said executing the OCR algorithm on the portion of the second image; and
writing the value to the database to associate the value with the predicted label.

9. A method comprising:
receiving, by a computer system, binary data that represents an image of a form;
executing an image analysis algorithm, by the computer system, that reads the binary data, that identifies visual data based on the binary data, and that analyzes the visual data to determine which of the visual data represent visual line segments;

creating a data structure, by the computer system, based on an identification of the visual line segments;

receiving data, by the computer system, that indicates a location of a cursor on a display and that indicates a particular location of the image;

predicting a location and a boundary of a field of the form, by the computer system, by:

accessing a first element of the data structure, based on a location indicated by a cursor, to identify a visual line segment to use in a determination of a predicted location of the field; and accessing a second element of the data structure, based on a location of the identified visual line segment or the location indicated by the cursor, to obtain information regarding other visual line segments to use in a determination of a predicted boundary of the field;

causing the predicted boundary of the field to be displayed at a location of the image determined based on the predicted location of the field;

writing data that indicates coordinates of the predicted boundary of the field to a database;

receiving a second image of a filled out version of the form;

accessing the database, based on the second image, to determine the coordinates of the predicted boundary of the field;

executing an algorithm on a portion of the second image that is determined based on the coordinates, wherein the portion of the second image being determined based on the coordinates includes being determined based on an oversizing of the predicted boundary;

determining a value of the field based on said executing the algorithm on the portion of the second image; and writing the value to the database to associate the value with the predicted label.

10. A computing system comprising:

a processor;

a networking interface coupled to the processor; and a memory coupled to the processor and storing instructions which, when executed by the processor, cause the computing system to perform operations including:

receiving, via the networking interface, binary data that represents an image of a form;

executing an image analysis algorithm that reads the binary data, that identifies visual data based on the binary data, and that analyzes the visual data to determine which of the visual data represent visual line segments;

writing data that represents one of the visual line segments to a selected element of a data structure, wherein the data structure is organized so that adjacent portions of the image map to adjacent elements of the data structure;

receiving data that indicates a particular location of the image;

predicting a location and a boundary of a field of the form by:

accessing a first element of the data structure, based on a location indicated by a cursor, to identify a visual line segment to use in a determination of a predicted location of the field; and accessing a second element of the data structure, based on a location of the identified visual line segment or the location indicated by the cursor, to obtain information regarding other visual line segments to use in a determination of a predicted boundary of the field; and causing the predicted boundary of the field to be displayed at a location of the image determined based on the predicted location of the field, wherein a first element of the data structure has an index, wherein a second element of the data structure has an index, wherein the index of the second element is a unit increment of the index of the first element, and wherein the first element and the second element are adjacent elements of the data structure because the index of the second element is a unit increment of the index of the first element.

11. The computing system of claim 10, wherein an index into the data structure is formed of a plurality of fields, wherein the index of the first element has a first field and a second field, wherein the index of the second element has a first field and a second field, and wherein the index of the second element is a unit increment of the index of the first element because the first field of the index of the second element is a unit increment of the first field of the index of the first element.

* * * * *